United States Patent [19]

Singer

[11] 4,408,807
[45] Oct. 11, 1983

[54] COMPRESSION MOLDING OF POROUS RETAINERS

[75] Inventor: Herbert B. Singer, Randolph, Mass.

[73] Assignee: The Charles Stark Draper Laboratory, Inc., Cambridge, Mass.

[21] Appl. No.: 233,396

[22] Filed: Feb. 11, 1981

[51] Int. Cl.$^3$ .......................... F16C 33/44; B28B 1/08
[52] U.S. Cl. ..................................... 308/187; 264/71;
  264/109; 264/126; 308/201; 29/148.4 C
[58] Field of Search .......................... 264/71, 109, 126;
  308/187, 201; 29/148.4 C

[56] References Cited

U.S. PATENT DOCUMENTS

| | | | |
|---|---|---|---|
| 2,695,425 | 11/1954 | Stott | 260/2.3 |
| 3,027,626 | 4/1962 | Murphy | 29/148.4 |
| 3,344,213 | 9/1967 | Vinson | 264/109 |
| 3,644,608 | 2/1972 | Valentine | 264/71 |

Primary Examiner—James R. Hall
Attorney, Agent, or Firm—Weingarten, Schurgin, Gagnebin & Hayes

[57] ABSTRACT

Apparatus and method for direct molding of porous retainers with unobstructed pores for proper lubricant dispensing for use in instrument ball bearings. A method for forming porous ball bearing retainers includes the steps of filling a complex mold with a prescribed quantity of polyamide-imide powder, compressing the powder at high temperatures, and curing the compressed powder for a specified time at high temperatures. A mold for producing such compression molded porous retainers includes a housing having a centrally disposed bore extending longitudinally therethrough. Two plungers are inserted into the bore, one from either end thereof. One of the plungers is spring biased and the inner termination of both plungers are spaced a predetermined distance from one another within the bore. A mandrel is inserted into the bore from one end and passes within both plungers. In this fashion, the inner terminations of the plungers define the top and bottom of the retainer mold cavity. The outer wall of the mandrel defines the inner annular surface of the mold cavity, while the housing bore wall defines the outer annular wall of the mold cavity. Pins project radially inwardly through holes in the housing and mate with holes in the mandrel passing through the mold cavity midway between the cavity top and bottom to define the ball pockets of the retainer mold cavity.

9 Claims, 10 Drawing Figures

COMPRESSION MOLDING OF POROUS RETAINERS

FIELD OF THE INVENTION

This invention relates generally to an apparatus and process for forming ball bearing retainers and more particularly to compression molding of porous ball bearing retainers for instrument applications.

BACKGROUND OF THE INVENTION

Reliable ball bearings having a long life are essential to the successful operation of many rotary instruments, particularly gyroscopes used in inertial navigation. An element critical to the success of any such ball bearing is the retainer ring which in general loosely positions the individual balls for rotation between the two races or grooves of relatively rotating instrument parts. Especially in gyroscope bearings, the retainer is advantageously porous, acting as a lubricant source and supplier of the small amount necessary to lubricate the balls and races.

Various substances which have the necessary porosity have been used to form such bearing retainers in the past. Among these are laminated phenolics, a porous nylon known by the trade name Nylasint and porous polyimide.

A type of porous polyimide (See U.S. Pat. No. 3,705,118) has been developed for use as a ball bearing retainer and the retainer formed of this material is made in the following manner. Particles of cured polyimide powder are mixed with an uncured polyimide powder binder and the two are blended together. The powder is isostatically molded into a rod configuration at 1000 pounds per square inch pressure at 350° temperature. The resulting rod is then cured at 500° F. or C. and cut into individual discs which are machined into the desired retainer configurations.

In machining of the polyimide rod into retainers, it is very important and usually difficult, time consuming and costly to produce porous surfaces that are not sealed, especially in the ball pocket region from which the lubricant is supplied. Such sealing severely reduces the wicking action of the retainer in absorbing and dispensing the lubricant through the retainer surfaces onto the rotating balls. Therefore, the machining process requires considerable time and expense because of the intricate nature of the finished retainer and because of the care that must be taken in fabricating it.

SUMMARY OF THE INVENTION

According to the present invention, a ball bearing retainer is directly molded from polyamide-imide powders to produce, without the uncertainties and difficulties of machining, a substantially unobstructed surface pore structure that avoids any impedance to the lubricant wicking properties of the retainer. Ball bearing retainers having the desired porosity are formed by applying a prescribed quantity of the constituent powder, preferably polyamide-imide powder, into the cavity of a complex mold shaped to the precise retainer dimensions. The mold is preferably filled or charged with a vibrating spatula to allow the powder to become properly distributed into the mold. The mold may then be vibrated for a predetermined time interval to allow proper settling of the powder. The powder is compressed at an elevated temperature, preferably 200° C. and the resulting green retainer then is cured within the mold.

The mold for forming the retainers according to the above described process includes a housing having a longitudinally aligned, cylindrical bore extending therethrough. A pair of tubular plungers is provided, with outer diameters matching the bore diameter. The plungers are provided with stops so that upon insertion into the bore from opposite ends the inner terminal ends of each plunger are spaced from one another within the bore to define the upper and lower edges of the mold cavity. One of the plungers may be provided with a spring bias for compression of powder within the cavity until its stop is reached. A mandrel is provided to be inserted through the housing bore inside both plungers. The mold cavity is thus defined by the inner terminations of the two plungers, the outer wall of the mandrel and the inner wall of the bore. A plurality of pins are provided to form the ball pockets. For this purpose the pins are adapted for insertion (and removal) through holes in the housing, radially bridging the cavity at its center and terminating in pockets in the mandrel outer wall.

Once formed, the retainer requires no machining. The occasional burrs that can occur around the retainer edges can be removed without lapping the surface pores.

DESCRIPTION OF THE DRAWING

The objects, advantages and features of this invention will be more clearly appreciated from the following detailed description taken in conjunction with the accompanying drawing in which.

and

Figure 10:
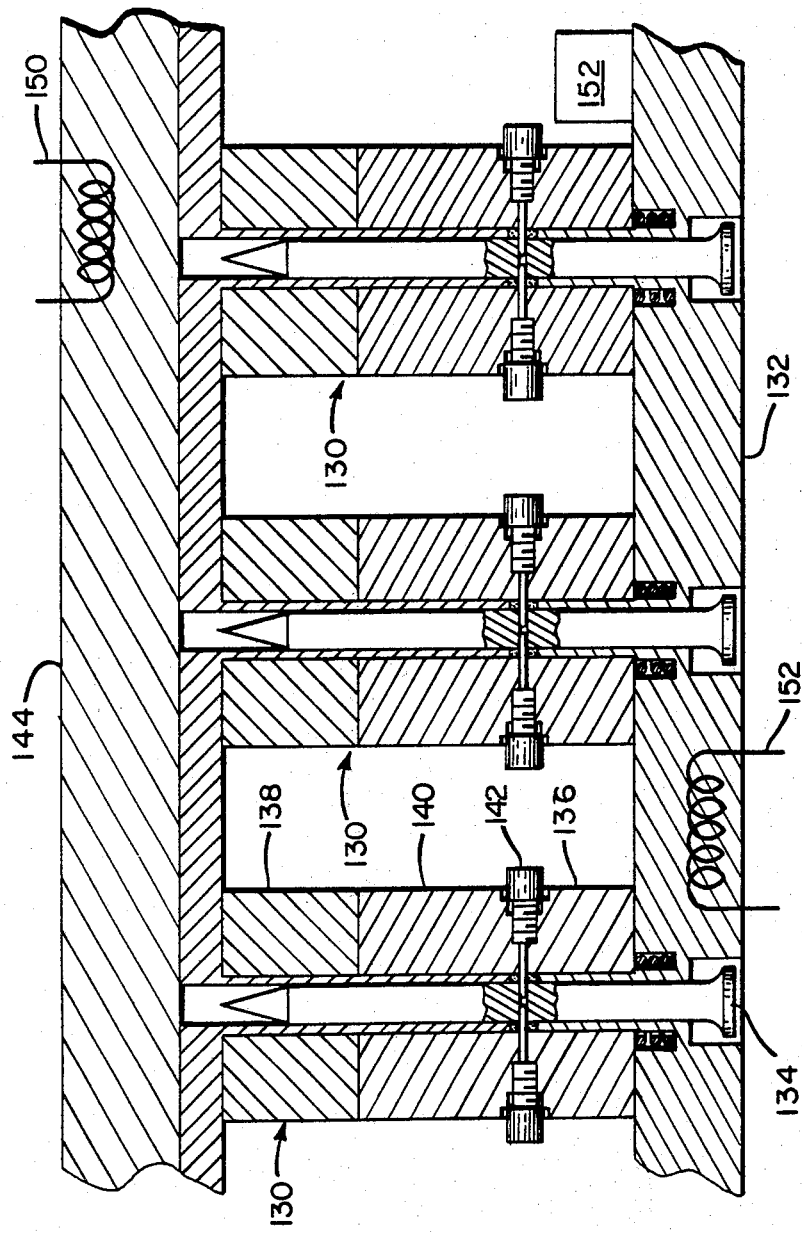

FIG. 10 is a pictorial view of a multi-cavity mold of the present invention.

DETAILED DESCRIPTION OF THE PREFERRED EMBODIMENT

This invention relates generally to a method for forming porous ball bearing retainers, an apparatus for implementation of that method and the retainer so formed. The method and apparatus of the present invention produce a ball bearing retainer having the desired surface and interior porosity, without machining thereof. Since no machining is required, the cost of producing the retainer and the time required for production thereof is far less than that required for prior art retainers. In addition, the difficulties and uncertainties of the machining process are avoided.

The first step in the method is to fill a retainer mold with a fixed or specified amount of powdered material from which the retainer is to be formed. In a preferred embodiment, this material is a polyamide-imide. The grain size of the powder affects the porosity and lubricant dispensing characteristics of the finished retainer. One form of polyamide-imide powder, commercially available as Monsanto 500, is exemplary of the grain size and type of material which provide the desired porosity and lubricant dispensing characteristics. However, other similar powders may be used, and the provision of Monsanto 500 as an example is not intended to be limiting. The powder must be weighed in advance to a very high degree of accuracy. A vibrating spatula may be used to fill the mold, in order to be certain that all of the powder is deposited therein. The mold is then preferably vibrated for a period, typically 60 seconds, so that all of the powder which has been poured therein resides where desired within the retainer mold cavity and not in any access passages. The powder is then compressed within the mold into the desired shape of the ball bearing retainer, and the mold is heated to a desired temperature, typically 200° C. The resulting compressed retainer is then cured (under the pressure of the mold) for a period of time at a specified temperature. Typically, this period of time is five minutes and the temperature is 200° C. The ball bearing retainer is then removed from the mold in its finished form.

Figure 1:
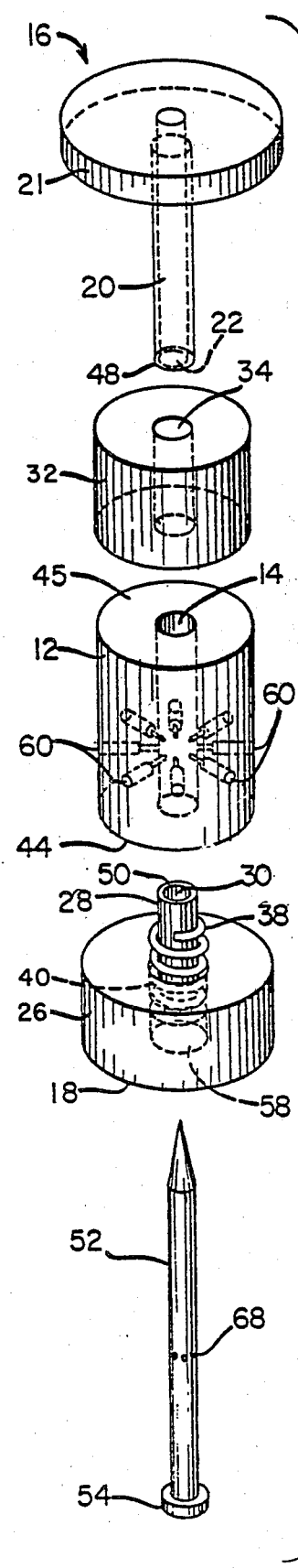
FIG. 1 is an exploded view of the mold according to the present invention.
Figure 2:
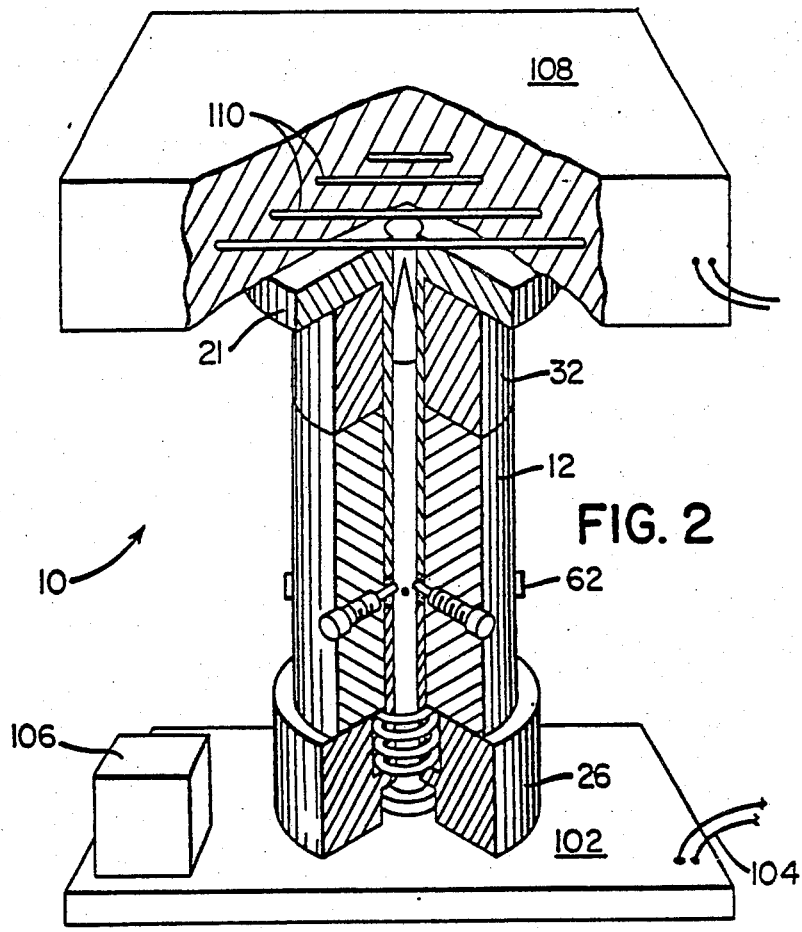
FIG. 2 is a partially cut-away perspective view of the assembled mold of FIG. 1.

With reference now to the drawing, and more particularly to FIGS. 1 and 2 thereof, an apparatus for implementing the method of this invention will be described. The following described apparatus is merely illustrative of an exemplary means for practicing the method of this invention and is not intended to be limiting. The use of other apparatus is possible under the scope of the invention.

A bearing retainer mold 10 includes a housing 12 which preferably has a cylindrical shape and which has a straight cylindrical bore 14 extending through it along the cylindrical housing axis. A pair of plungers 16 and 18 are provided. Plunger 16 has a cylindrical, enlarged head portion 21 which has an outer diameter preferably equal to or greater than that of housing 12. Extending from one base of head portion 21 is a tube 20. Tube 20 is provided with a centrally disposed bore 22 extending therethrough and through head portion 21. The outer diameter of tube 20 is preferably equal to the inside diameter of bore 14 so that tube 20 may be snugly inserted therein. Plunger 18 likewise has an enlarged head portion 26 and a tube 28 extending from one base thereof. Tube 28 is also provided with a centrally disposed bore 30 having the same diameter as bore 22, and tube 28 has the same wall thickness and outside diameter as tube 20. A cylindrical stop 32 is provided between head portion 21 of plunger 16 and the upper surface of housing 12. Stop 32 typically has an outside diameter equal to that of housing 12 and has a bore 34 passing therethrough along the axis thereof having the same diameter as bore 14.

When mold 10 is assembled, tube 20 extends through bore 34 of stop 32 and into bore 14 from top surface 45 of housing 12. Similarly, tube 28 extends into bore 14 from bottom surface 44 of housing 12. A biasing element, preferably a compression spring 38, is provided between head portion 26 of plunger 18 and bottom surface 44 of housing 12 to bias plunger 18 downwardly. Spring 38 typically resides in an annular cavity 40 formed in head portion 26 disposed about tube 28 and extends longitudinally along tube 28 around the outer surface thereof to be captured between surface 42 of head portion 28 and surface 44 of housing 12. A recess may also be provided in surface 44 of housing 12 for accommodation of spring 38. When tubes 28 and 20 are inserted into bore 14 as described, inner termination or distal end 48 of tube 20 is spaced from inner termination or distal end 50 of tube 28 a distance which is equal to or greater than the desired axial dimension of the retainer to be formed.

A mandrel 52 extends through bore 30 of tube 28 from head portion 26 and into bore 22 of tube 20. Mandrel 52 typically is provided with a pointed end, and an enlarged head 54 which has an outer diameter greater than that of bore 30 to prevent mandrel 52 from extending further than desired into bore 22 or bore 30. Mandrel 52 has an outside diameter equal to the inside diameter of both bores 22 and 30 to fit snugly therein. A circular cavity 58 may be provided within enlarged portion 26 adjacent the lower end thereof to accommodate head 54.

Figure 3:
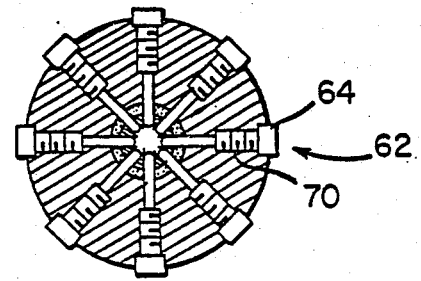
FIG. 3 is a horizontal section of the assembled mold of FIG. 1.
Figure 4:
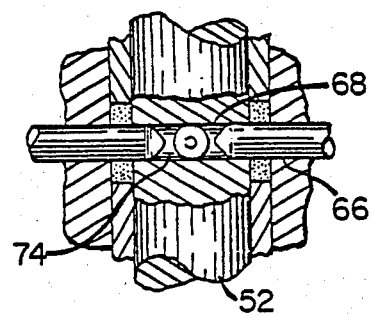
FIG. 4 is a partial cut-away, expanded view of the cavity region of the assembled mold of FIG. 1.
Figure 5:
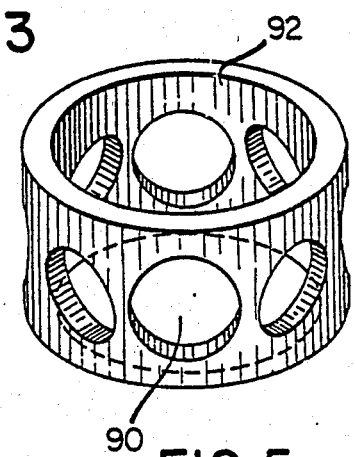
FIG. 5 is a perspective view of the finished retainer formed by the mold of the present invention.

A plurality of equally spaced apertures is provided in an array around the outer circumference of housing 12. Apertures 60 are positioned at the same axial location on housing 12 and extend in a radial direction from the outer surface of housing 12 into bore 14. The number of such apertures is equal to the number of ball pockets desired in the resulting retainer, which in the embodiment of FIGS. 1-4 equals 8. Associated with each aperture 60 is a pin 62 which is insertable therein. Each pin 62 has an enlarged head 64 adapted to permit a tool to engage pin 62 for rotation thereof, and a ball socket insert 66 which extends from housing 12 through bore 14. Insert 66 has an outside diameter which is equal to the inside diameter of the ball pockets 90 (FIG. 5) of the desired retainer 92 (FIG. 5). Typically, pins 62 are retained in place by screw threads which are disposed on a threaded middle portion 70 of pin 62 and which engaging mating screw threads disposed on the inner surface of aperatures 60. As shown in FIGS. 3 and 4, inserts 66 of each pin 62 extend through bore 14 and into a mating hole 68 in mandrel 52 so that the ends 74 thereof converge on the axis of mandrel 52. Preferably, ends 74 are tapered so that all of the converging ends 74 may be accommodated in close proximity to one another without touching.

Head portion 26 of plunger 18 may be mounted onto a base 102. Base 102 may be provided with a header energized through leads 104 and vibrating means 106 of a type known in the art. A press 108 may be secured to or be disposed in contact with head portion 21 of plunger 16. Press 108 is provided with a heater 110 and has known means for urging plunger 16 downwardly to urge distal end 48 toward distal end 50 of plunger 18 until a predetermined separation as defined by stop 32, in conjunction with other mold parts, is reached.

The concept of a single mold 10, as described above, can be extended to a multi-cavity apparatus as shown in FIG. 10. Thus, a plurality of identical molds 130 which are similar to mold 10 may be provided in conjunction with a common base 132 on which molds 130 are mounted. Each mold 130 includes a mandrel 134, lower plungers 136, upper plungers 138, housing 140 and pins 142. Secured to each upper plunger 138 is a common press 144. Press 144 raises and lowers the upper plunger 138 of each mold 130 simultaneously, and when desired, urges the upper plunger 138 of each mold downwardly to compress the powder between the distal ends of upper plunger 138 and lower plunger 136. Heater means 150 in press 144 and heater means 152 in base 132 serve to provide the necessary heating for forming and curing the retainers in all molds 130. Similarly, vibration means 152 in base 132 serve to vibrate all molds simultaneously when desired to make certain the powder is properly positioned in the mold. By using the apparatus of FIG. 10, a desired plurality of retainers 92 may be formed simultaneously, thereby reducing the time and cost required to produce each retainer.

The outer diameter of inserts 66 of each pin 62 precisely equals the inside diameter desired for ball pockets 90 of retainer 92. The thickness of the walls of tubes 20 or 28 determines the thickness of the retainer wall. The diameter of mandrel 52 determines the inside diameter of the retainer, and the diameter of bore 14 determines the outside diameter of the retainer. Thus, the dimensions of these elements must be precisely controlled in their manufacture.

The process for producing a retainer 92, as shown in FIG. 5, will now be described in more detail with particular reference to the apparatus of FIGS. 1-4. Initially, the desired material of which the bearing retainer 92 is to be composed is provided in a powdered form. Typically, this material is a polyamide-imide powder. The precise amount of powder required to form the finished bearing retainer 92 is measured. Tube 20 of plunger 18 is inserted into bore 14 of housing 12 from surface 44 thereof with spring 38 captured between head portion 26 of plunger 18 and surface 44. Mandrel 52 is inserted into bore 30 so that head 54 resides in cavity 58, and end 20 projects upwardly past distal end 50 of tube 28 and into bore 14. Housing 12 is secured to base 102 so that head 54 of mandrel 52 and head portion 26 rest on base 102, as in FIG. 2. Each pin 62 is inserted into its associated aperture 60 until inserts 66 project into their associated holes 68 in mandrel 52. The previously measured quantity of powder is poured into bore 14 from surface 45 of housing 12. Typically a vibrating spatula is used to pour the powder down into the cavity. The vibrational effect is desired so that none of the powder remains attached to the spatula and so that all of the measured quantity of powder is deposited within bore 14. Housing 12 is vibrated for a period of time by vibrator 106, typically one minute, to assure that all of the powder reaches the mold cavity. Stop 32 is inserted onto surface 45 of housing 12 and plunger 16 is brought downwardly so that tube 20 extends down into bore 14 and surrounds mandrel 52. The powder is compressed between distal end 48 of plunger 16 and distal end 50 of plunger 18 by press 108 which applies pressure to head portion 21 of plunger 16, comprising spring 38. Spring 38 acts to cushion the movement of distal end 48 toward distal ends 50 to smooth the compression of the powder. Distal ends 48 and 50 are urged together until head portion 21 engages stop 32 and head portion 26 engages surface 44. At this point, distal ends 48 and 50 are spaced a distance equal to the desired axial dimension of the retainer. Simultaneously therewith, housing 12 is subjected to a high temperature, preferably 200° C., by heaters 104 and 110. The resulting retainer is then allowed to cure under the pressure applied by press 108 for a period of time at high temperature. Typically, the curing time is five minutes and the retainer is maintained at a temperature of 200° C. by heaters 104 and 110. The retainer may be removed by withdrawal of mandrel 52 after withdrawal of pins 62 from their associated apertures 60, and by withdrawal of plunger 18 from the bottom of housing 12.

Figure 6:
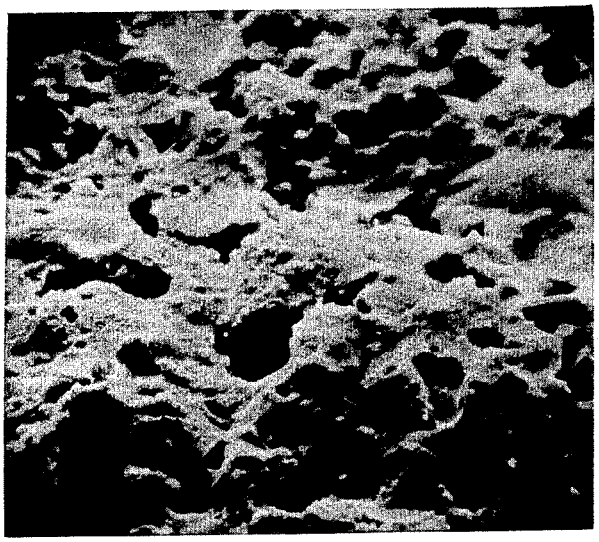
FIG. 6 is a photomicrograph of a fractured surface of a retainer formed by the method and apparatus of the present invention.
Figure 7:
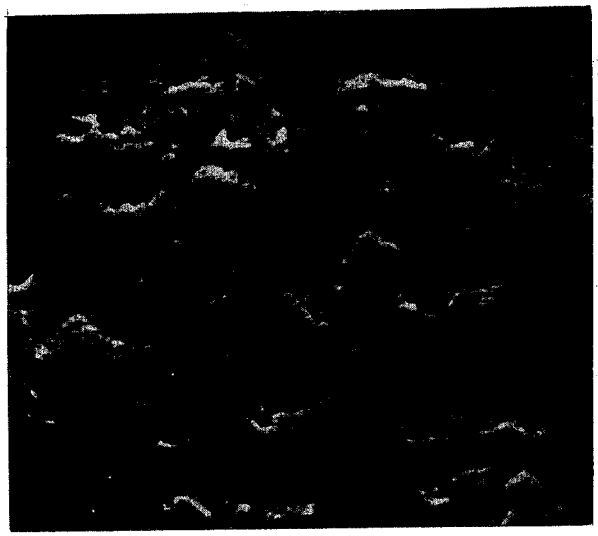
FIG. 7 is a photomicrograph of an exposed surface of a retainer formed by the method and apparatus.
Figure 9:
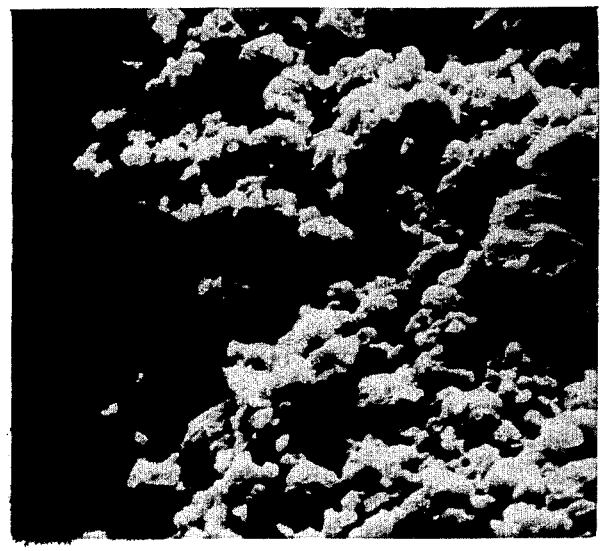
FIG. 9 is a photomicrograph of a fractured surface of a prior art retainer.
Figure 8:
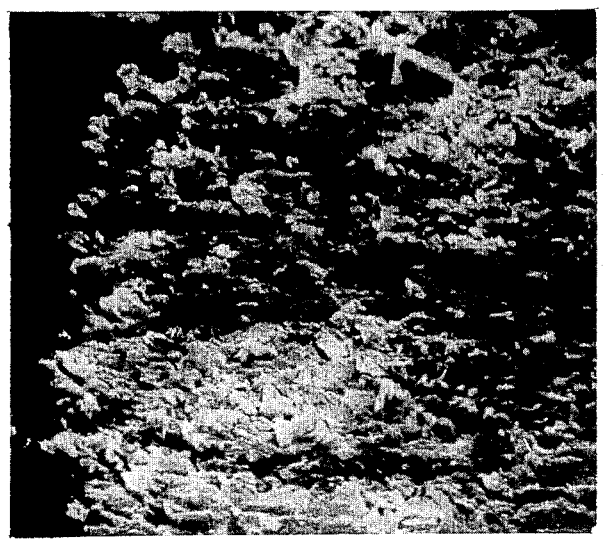
FIG. 8 is a photomicrograph of a retained surface formed by a prior art machining process.

A typical finished retainer produced by the method and apparatus of this invention is shown in FIG. 5. Retainer 92 is provided with a plurality of ball pockets 90, which equals the number of pins 62 in the apparatus. Retainer 92 as produced by the above described method, is provided with the strength required for ball bearing use and the porosity necessary for impregnation with a lubricant. This porosity is shown in FIG. 6, which is a photomicrograph of a fractured surface of a retainer formed by the method and apparatus described above. The porous structure needed for impregnation with a lubricant is shown as the dark areas. In addition, the exposed surfaces of the ball pockets have sufficiently open and exposed pores to allow wicking of lubricant onto the ball bearings. This feature is shown in FIG. 7 which is a photomicrograph of an exposed surface of the retainer formed by the method and apparatus described above. It will be noted that the pores of the retainer material are fully open at the surface also. FIG. 7 may be contrasted to FIG. 8 which is a photomicrograph of the machined surface of a prior art ball bearing retainer. It will be noted that in FIG. 8 machining has closed or reduced the size of most of the pores at the surface, thereby impeding the flow of lubricant from the retainer onto the balls within the ball pcokets. FIG. 9, is a photomicrograph of a fractured surface of the same prior art retainer wherein the greater internal porosity of the material is evident. Thus, it may be demonstrated how machining serves to alter the pore structure at the surface.

Below is a table showing the retainer dimensions in a large sampling of ball bearing retainers produced by the method and apparatus of this invention.

| COMPRESSION MOLD: RING PARAMETERS | | | | |
|---|---|---|---|---|
| | | RING PARAMETERS | | 118 NO. |
| 110 PARAMETER | 112 GOAL | 114 AVERAGE | 116 VARIANCE | OF SYMBOLS |
| Outside Diameter (in.) | 0.476–0.472 | 0.472 | 0.0004 | 11 |
| Inside Diameter (in.) | 0.385–0.383 | 0.384 | 0.0006 | 11 |
| Width (in.) | 0.196–0.194 | 0.192 | 0.004 | 11 |
| Pocket Diameter (in.) | 0.0975–0.0965 | 0.0972 | 0.0003 | 88 |
| Tensile Strength | 600 | 950 | 0 | 1 |
| Pore Size (uin.) | 3–6 | 3–6 | 0 | 1 |
| Pore Volume (uin.) | 0.15–0.25 | 0.2 | | 1 |
| Coplanar (in.) | 0.001 | 0.0013 | | |

Column 110 identifies the parameter that was measured for each retainer, column 112 is the desired tolerance for that particular parameter, column 114 is the average value measured for each parameter for all the samples tested, column 116 is the variance in measurement for each parameter, and column 118 is the number of samples tested. The 88 sample size for the pocket diameter parameter indicates a sample of 11 retainers with 8 pockets per retainer. It can be seen from the above table that the average value of each parameter fell well within the desired range and that the variance in each case was quite small. Thus, the method and apparatus of this invention reliably produce a ball bearing retainer within desired tolerances.

The above described method may be used to produce ball bearing retainers of varying sizes and compositions.

The method of producing the ball bearing retainer may also utilize any one of a number of different types of materials or compositions for forming the retainer. The apparatus described above for implementing this method is only exemplary, and other apparatus may be used. Modifications and improvements will occur within the scope of this invention. Thus, the above description is intended as exemplary only, the scope of the invention being as defined in the following claims.

What is claimed is:

1. A method for direct molding of a ball bearing retainer comprising the steps of:
    filling a ball bearing retainer mold with a predetermined quantity of polyamide-imide powder;
    compressing said powder in said mold and applying an elevated temperature thereto; and
    subsequently curing said compressed powder at a curing temperature for a predetermined time interval to form from the powder a porous retainer having a plurality of ball bearing pockets with the retainer pores open to the surface in the pockets to promote the flow of an impregnating lubricant across said surface.

2. The method as recited in claim 1 further comprising the step of vibrating the filled mold to distribute said powder within said mold prior to said compressing step.

3. A method for use with apparatus for direct molding of ball bearing retainers, wherein said apparatus comprises:
    a housing including a cylindrical bore passing therethrough having a first end and a second end;
    first tubular plunger means adapted for insertion into said housing bore from the first end thereof with a distal end disposed within said housing bore, said first plunger means having an inner cylindrical passage;
    second tubular plunger means adapted for insertion into the second end of said housing bore, said second plunger means having a distal end adapted to be spaced from the distal end of said first plunger means when said second plunger means is inserted into said housing bore, said second plunger means having an inner cylindrical passage;
    mandrel means adapted for insertion within the inner cylindrical passage of at least one of said first and second plunger means to extend between the distal ends of said first and second plunger means; and
    a plurality of ball socket forming means adapted to be inserted into radially extending holes passing through said housing and into said housing bore between the distal ends of said first and second plunger means and into corresponding holes in said mandrel;
    said method comprising the steps of:
    inserting said ball socket forming means into their associated holes, said ball socket forming means extending through said housing bore and into said mandrel means;
    applying a predetermined quantity of polyamide-imide powder into said housing bore from said first end thereof;
    inserting said first plunger means into said housing bore from said first end thereof until the distal end of said first plunger means is closely adjacent but spaced from the distal end of said second plunger means;
    compressing said fixed quantity of powder between the distal end of said second plunger means and the distal end of said first plunger means to the shape of a ball bearing retainer;
    heating said compressed quantity of powder for a predetermined time interval to produce said ball bearing retainer having open surface pores in the region formed by said ball socket forming means; and
    curing said compressed and heated powder within said housing bore.

4. A ball bearing retainer having a plurality of ball pockets with open surface pores adapted to promote the flow of an impregnating lubricant through said surface pores and adapted for applying the lubricant to ball bearings within said ball pockets, said ball bearing retainer being comprised of polyamide-imide and formed according to the method of claims 1, 5 or 3.

5. A method for direct molding of a porous ball bearing retainer comprising the steps of:
    applying a predetermined quantity of a heat and compression moldable powder of a material of which said retainer is to be formed to a cavity of a mold having the shape of said retainer; and
    heat and pressure treating the powder in said cavity to produce a unitary, solid retainer with substantial surface and internal porosity.

6. The method of claim 1 wherein said elevated temperature is approximately 200° C.

7. The method of claim 5 wherein said treating step includes a curing step.

8. A method for direct molding of a surface porous ball bearing retainer comprising the steps of:
    charging a mold with a predetermined quantity of a heat and pressure setting material in a powdered form of a type which when subjected to heat and pressure forms a porous unitary element;
    the powder having a grain size selected to provide predetermined retainer lubricant dispensing characteristics in the molded retainer;
    applying heat and pressure to the quantity of material within the mold to form a porous retainer having a plurality of ball bearing pockets having the retainer pores open at the surface of the pockets to promote the flow of an impregnating lubricant through said surface pores.

9. A ball bearing retainer molded according to the method of claim 1.

* * * * *